United States Patent
Fagan et al.

(10) Patent No.: US 6,928,432 B2
(45) Date of Patent: Aug. 9, 2005

(54) SYSTEM AND METHOD FOR INDEXING ELECTRONIC TEXT

(75) Inventors: Lawrence Fagan, Los Altos, CA (US); Daniel Berrios, San Francisco, CA (US); Evan Chou, San Francisco, CA (US); Anupam Datta, Stanford, CA (US); Sujith Surendran, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 198 days.

(21) Appl. No.: 10/352,775

(22) Filed: Jan. 27, 2003

(65) Prior Publication Data

US 2003/0220915 A1 Nov. 27, 2003

Related U.S. Application Data

(63) Continuation-in-part of application No. 09/558,411, filed on Apr. 24, 2000, now Pat. No. 6,535,873.

(51) Int. Cl.[7] .......................... G06F 17/30; G06F 17/00
(52) U.S. Cl. ........................... 707/3; 707/102; 707/103
(58) Field of Search ............................... 707/1–3, 6–7, 707/10, 100–102, 203; 715/513–514

(56) References Cited

U.S. PATENT DOCUMENTS

| | | | |
|---|---|---|---|
| 5,309,359 A | 5/1994 | Katz et al. | |
| 5,404,295 A | 4/1995 | Katz et al. | |
| 5,404,506 A | 4/1995 | Fujisawa et al. | |
| 5,418,948 A | 5/1995 | Turtle | |
| 5,495,605 A | * 2/1996 | Cadot | 707/4 |
| 5,737,739 A | 4/1998 | Shirley et al. | |
| 5,787,234 A | 7/1998 | Molloy | |
| 5,799,268 A | 8/1998 | Boguraev | |
| 5,873,056 A | 2/1999 | Liddy et al. | |
| 5,918,232 A | * 6/1999 | Pouschine et al. | 707/103 R |
| 5,940,821 A | 8/1999 | Wical | |
| 5,963,940 A | 10/1999 | Liddy et al. | |

OTHER PUBLICATIONS

Dugan et al., *Automation and Integration of Components for Generalized Semantic Markup of Electronic Medical Texts*, Stanford Medical Informatics, SMI–1999–0792, Apr. 1999.

Berrios et al., *Knowledge Requirements for Automated Inference of Medical Textbook Markup*, Stanford Medical Informatics, SMI–1999–0802, Jun. 1999.

(Continued)

*Primary Examiner*—Alford W. Kindred
(74) *Attorney, Agent, or Firm*—Lumen Intellectual Property Services, Inc (57) ABSTRACT

A new and useful updating tool is provided for indexing electronic text in a highly integrated electronic text indexing and search system. The integrated system encompasses a concept model, a query model, an enhanced markup tool, a user interface, and a search engine. A domain expert utilizes the integrated system to efficiently and effectively indexing electronic text for precise and fast retrieval by a search engine. The updating tool aids the indexing process as a consequence of changes in the query model, to an indexed document, or both. The updating tool comprises a document change tool and a query model change tool as well as an enhanced markup tool and an enhanced query model tool. The updating tool guides the domain expert by suggesting which indices need to be updated and flags index entries that need to be removed.

15 Claims, 11 Drawing Sheets

OTHER PUBLICATIONS

Kim et al., *MYCIN II: Design and Implementation of a Therapy Reference with Complex Content-Based Indexing*, Stanford Medical Informatics, SMI-98-0752, Oct. 1998.

Shortliffe et al., *The Infectious Diseases Physician and the Internet*, Stanford Medical Informatics, SMI-1990-0769, Feb. 1999.

Frisse, Mark E., *Searching for Information in a Hypertext Medical Handbook*, Commun. ACM 31.7 (Jul. 1988), pp. 881-886.

Jonathan M. Dugan et al., *Automation and Integration of Components for Generalized Semantic Markup of Electronic Medical Texts*, Stanford Medical Informatics; AMIA'99, Annual Symposium, Nov. 6-10, 1999, Marriott Wardman Park Hotel, Washington DC.

Julian Kupiec et al., MURAX: A robust Linguistic Approach for Question Answering Using an On-Line Encyclopedia, SIGIR 1993: 181-190 (new, enclosed).

Daniel C. Berrios, Automated Indexing for Full Text Information Retrieval, 2000 AMIA Fall Symposium, Los Angeles, CA (new, enclosed).

* cited by examiner

SYSTEM AND METHOD FOR INDEXING ELECTRONIC TEXT

CROSS-REFERENCE TO RELATED APPLICATIONS

This is a continuation-in-part patent application of a U.S. patent application Ser. No. 09/558,411 filed Apr. 24, 2000, now U.S. Pat. No. 6,535,873, titled "System and Method for Indexing Electronic Text", the content of which is hereby incorporated herein by reference.

STATEMENT REGARDING FEDERALLY SPONSORED RESEARCH OR DEVELOPMENT

This invention was supported in part under Cooperative Agreement No. DAMD 17-97-2-7016 awarded by the U.S. Army Medical Research Acquisition Activity. The U.S. government has certain rights in the invention.

FIELD OF THE INVENTION

This invention relates generally to indexing electronic text and more particularly to a highly integrated electronic text indexing and search system having a new and useful updating tool for facilitating indexing of electronic text.

BACKGROUND ART

Modern computing and networking technology including the Internet makes it possible to organize, store and transfer large bodies of electronic data with minimal effort virtually anywhere in the world. With so much material so easily accessible, many have realized that the real issue is no longer getting enough information, but sorting out what is useful to them from vast quantities of irrelevant material. In a conventional search system, indexing, also known as marking up, the content of a document means that certain terms or keywords are selected or otherwise used to represent the content of the document. Online search engines often use these index terms to locate web-based resources. A typical online information retrieval system matches query terms with the index terms to identify relevant information. Unfortunately, when search terms occur in inappropriate contexts, queries to these systems often retrieve irrelevant material. Most users need to find answers to very specific questions, but this type of conventional search lacks precision. Information retrieval systems using statistical methods and natural language processing also suffer from inherent query ambiguity: these systems cannot identify the context of the query terms precisely.

This need for precise and fast retrieval of information is even more pronounced in certain professions. For example, to provide optimal patient care, health-care professionals in clinical environments need to retrieve, in a timely fashion, accurate and up-to-date health-care and medical related information from a variety of online resources such as electronic textbooks, scientific journals, news, research papers, edited reviews, and medical databases. In recent years, researchers have developed a variety of systems to improve the indexing and searching of these electronic resources. The primary goal is to increase research precision/specificity (i.e., fraction of relevant search hits/results to all hits) without severely reducing recall/sensitivity (i.e., fraction of relevant hits to all possible relevant hits in the database).

For example, a content-based indexing system is disclosed in "MYCIN II: Design and Implementation of a Therapy Reference with Complex Content-Based Indexing" Proc Amia Symp 1998: 175–179, by Kim et al. Co-developed by co-inventors Fagan and Berrios, MYCIN II is a prototype information retrieval (IR) system capable of searching content-based markup in an electronic textbook on infectious disease. Users select a query from a predetermined set of query templates in the query model. The selected query is then passed to a search engine for processing.

A markup tool for the MYCIN II search engine was developed by co-inventors Berrios and Fagan and disclosed in "Automated Text Markup for Information Retrieval from an Electronic Textbook of Infectious Disease" Proc Amia Symp 1998:975. Domain experts use the markup tool to provide the Hypertext Markup Language (HTML) indexing required for the MYCIN II search engine. As is known in the art, indexing medical textbooks and references relies heavily on the domain expert's expertise and knowledge, e.g., an infectious disease expert, to properly generate concepts, markup medical text based on these concepts, and generate query templates. Accordingly, it is no surprise that, in this system, a significant amount of manual work was required by the domain experts to generate the ontology of concepts in the concept model and the set of questions in the query model.

In addition, because the tools such as the markup tool and the search engine in the MYCIN II system were developed independently, there was minimal integration amongst them. This resulted in having the domain experts repeating several common tasks when using these tools.

In the above-referenced U.S. patent application, we addressed the aforementioned deficiencies by providing a highly integrated system and method that significantly increases search precision while reducing the amount of manual work, repeated common tasks, time, and cost necessary to markup/index a file of electronic text for searching.

There is a continuing need, however, to correspondingly and appropriately update the indices whenever a previously indexed document and/or the query model changes.

SUMMARY

A new and useful tool is presented for updating indexed electronic text affected by document changes, query model changes, or both. In the context of this application, an indexed document is a document that has been marked up by a domain expert. The terms "indexed" and "marked-up" are thus used interchangeably herein. Similarly, within the context of this application, both the terms "indexers" and "markers" are used herein to refer to domain experts. This updating tool is particularly useful in a highly integrated electronic text indexing and search system such as one disclosed in the above-referenced U.S. patent application. Briefly, the Internet-based indexing and search system encompasses a concept model, a query model, a markup tool, a concept model tool, a query model tool, at least one user interface, and a search engine. Based on a user query submitted via the user interface, the search engine retrieves relevant information, e.g., portions of an indexed document, from a set of documents indexed by the domain experts. The retrieved information provides more precise answers to queries and thus is more useful to users.

The updating tool aids the indexing process as a consequence of changes involving the query model and/or the indexed document. For example, the updating tool automatically compares newly updated and previously indexed documents and generates indices that need to be correspondingly updated. It intelligently guides the domain expert by suggesting which indices need to be updated and flags index entries that need to be removed.

The updating tool comprises a document change tool and a query model change tool. The updating tool further comprises an enhanced markup tool with an improved indexing interface. The document change tool comprises an XHTML compare tool and a text change tool. The XHTML compare tool compares the newly updated and the previously indexed documents and outputs a composite file, which is converted to a format compatible with the underlying system. An index retrieval tool, which can be a part of the text change tool, puts indexing information into the composite file. In an embodiment, all paragraphs and sentences in the composite file are identified with corresponding domain identification numbers. The text change tool takes the indexing information and modifies the index database accordingly. A text analyzer, which can be a part of the enhanced markup tool, further processes and analyzes the composite file and generates a final version thereof having an index consistent with the integrated electronic text indexing and search system. The system uses the finalized composite document with indexing information in the index database to highlight or otherwise identify text elements, such as a chapter, a section, a paragraph, a sentence, or a word, that need to be updated. For each such element, a domain expert selects the corresponding indices and corrects them. Because the domain expert only needs to index/re-index highlighted portions of the text and does not have to re-index the entire document, the time and hence cost necessary to index a previously indexed document that is affected by changes/updates to the original document is greatly reduced.

In a similar fashion, when the query model is changed or modified, e.g., by a domain expert, the query model change tool, which comprises an enhanced query model tool, logs all the changes to a log file. The integrated electronic text indexing and search system takes the log file and highlights or otherwise identifies, via an indexing interface of the enhanced markup tool, sections of documents where the existing text has previously been indexed with a query that has changed. Furthermore, the enhanced markup tools shows how the query has been changed to facilitate re-indexing the section of text, if necessary.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
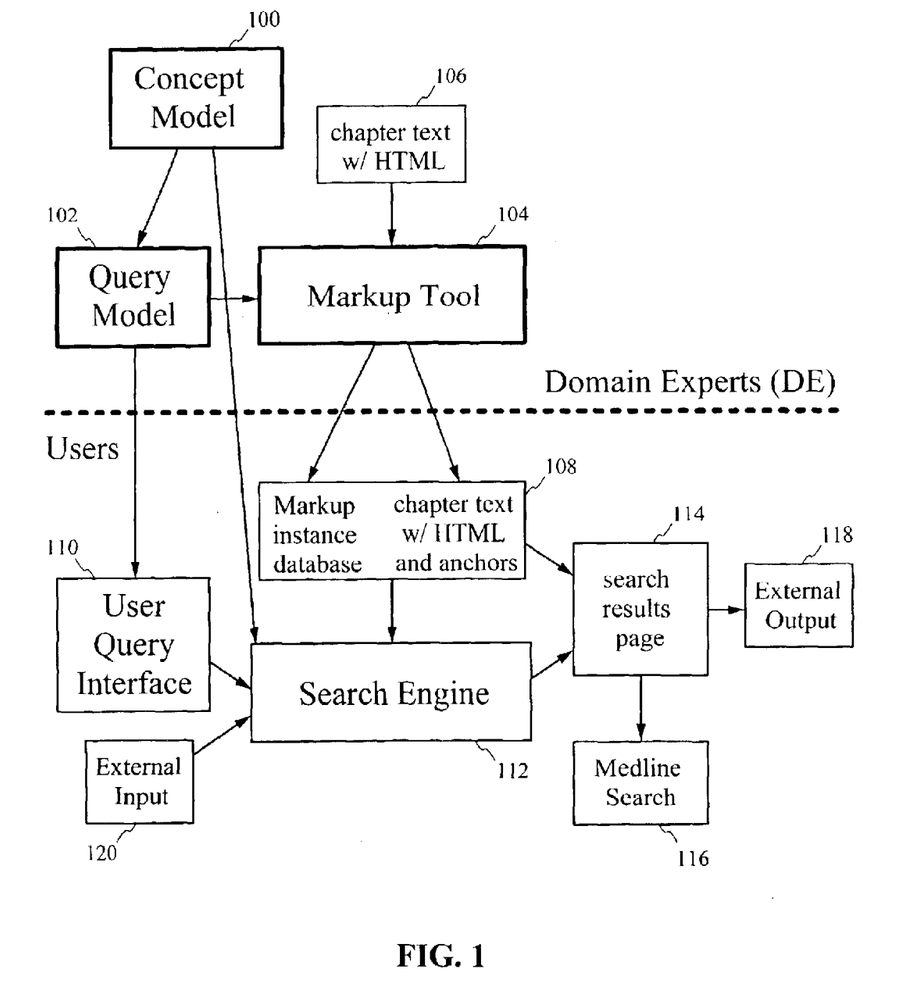
FIG. 1 is a diagram illustrating an integrated electronic text indexing and search system where the present invention is embodied.

A new and inventive updating tool is provided herein to assist domain experts in updating indexed documents in a highly integrated electronic text indexing and search system such as one disclosed in the above-referenced U.S. patent application. As shown in FIG. 1, the integrated system encompasses a concept model 100, a query model 102, a markup tool 104, a user interface 110, and a search engine 112. Each of these tools is first introduced with reference to FIGS. 1–4. The integration thereof is next discussed. The updating tool is then described in detail with reference to FIGS. 5–9.

The Basic Tools

Figure 1A:
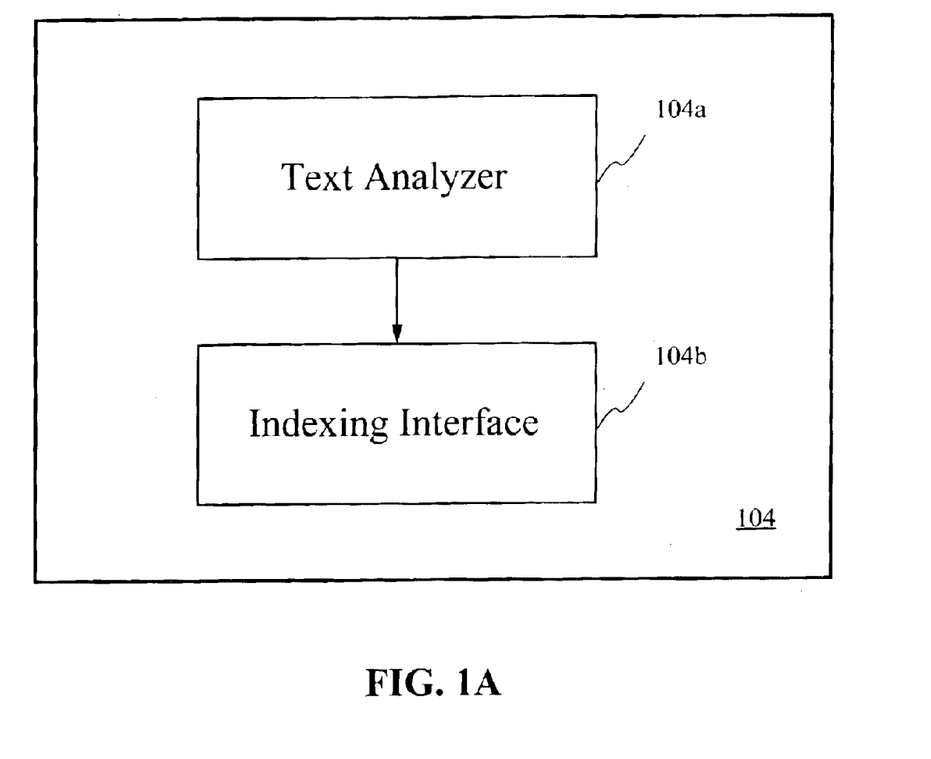
FIG. 1A schematically shows components (a text analyzer and an indexing interface) of the markup tool shown in FIG. 1.

In an exemplary embodiment, the markup tool 104 is composed of two modules as shown in FIG. 1A. The text analyzer 104a performs preparatory steps such as converting the input document format into one that is compatible with the system, identifying all the paragraphs and sentences in the input document, inserting corresponding identifiers into the document, and conducts syntactic and semantic analysis, including looking up phrases in thesaurus, of the text portions of the document. These preparatory steps, which will be further described with reference to FIG. 5A, are necessary for the document to be used in the indexing interface 104b. The indexing interface 104b guides indexers, i.e., domain experts, by displaying the document to be indexed, storing and retrieving all indices of the document, and suggesting index choices.

Figure 2:
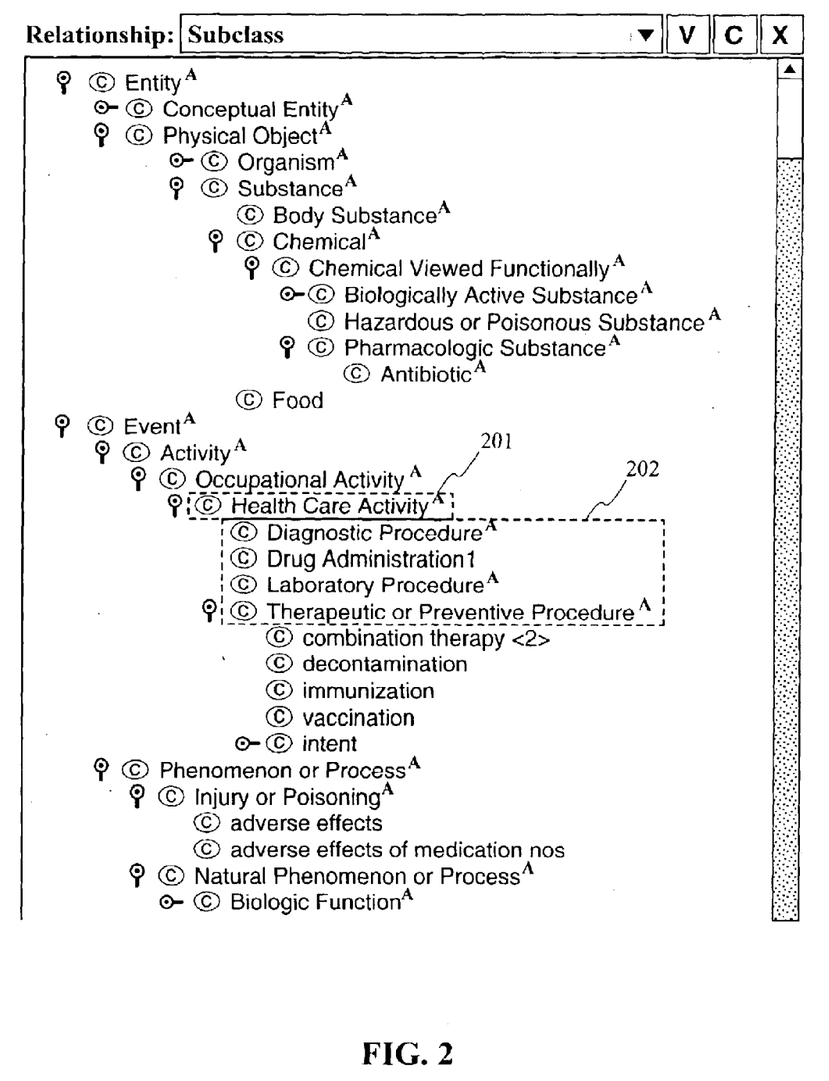
FIG. 2 illustrates the concept model tool of FIG. 1.
Figure 3:
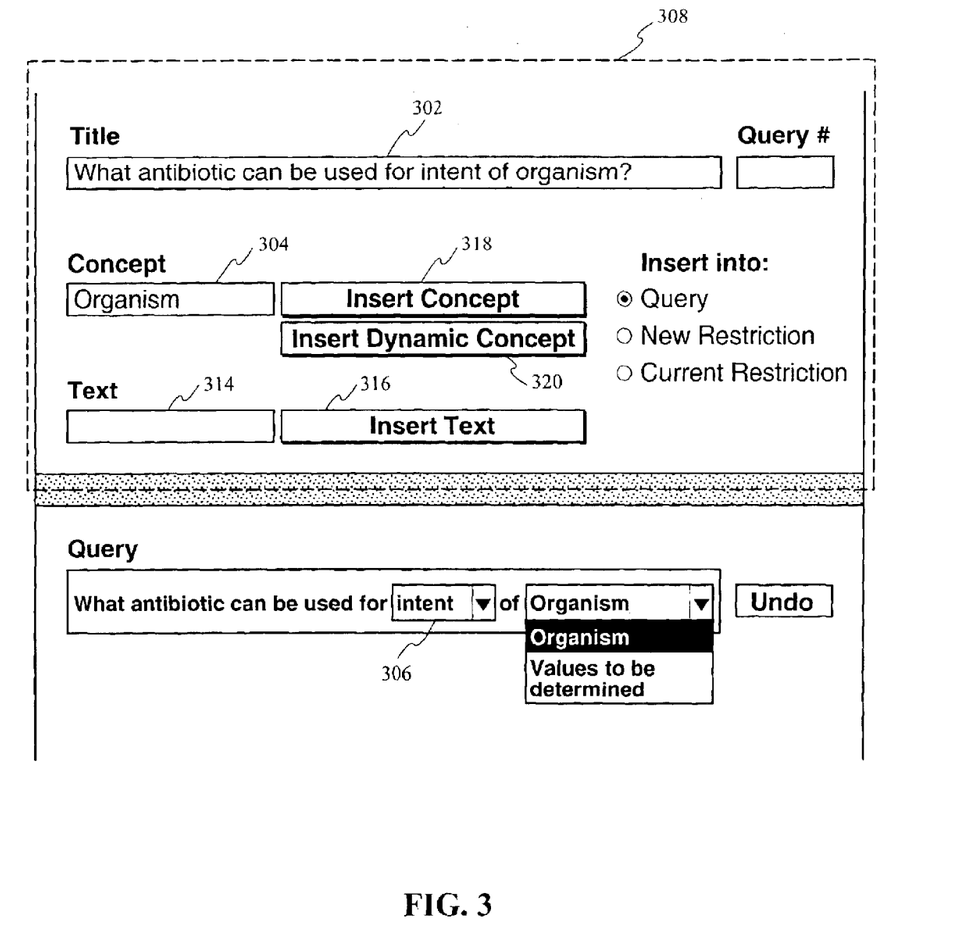
FIG. 3 illustrates the query model tool of FIG. 1.

As shown in FIG. 2, the concept model 100 defines a set of concept-value pairs. Concepts 201 are variables that take on as their values one of the listed values 202 for each concept. There are separate values 202 listed for each concept 201. In an example, the concept model for the medical domain can be based on the Unified Medical Language System® semantic network.

The query model 102 defines a set of structured queries that a user uses to search. Using the query model tool shown in FIG. 3, the set of queries is constructed/created by a domain expert in terms of a subset of the concept-value pairs in the concept model. Each query has one or more replaceable parameters that correspond one-to-one with concepts in the concept model. The current question in a query model is displayed in section 302. Each existing query is displayed, e.g., via a box 304, to allow the domain expert to edit the query. Each query is also displayed, e.g., via one or more menus 306, to show the domain expert what the user-selectable values are. The domain expert can also add queries to the query model through section 308. The domain expert constructs the queries by entering free text in boxes such as 314, and designating the text with, e.g., the "Insert Text" button 316. This indicates to the query model tool that the text entered in box 314 is "fixed" and not user-selectable. For the selectable text menus 306, the domain expert can choose one of the enumerated concepts displayed in the menus 318 and 320. The enumerated concepts in the menus 318 and 320 come respectively from the concept model 100 and from "dynamically-valued concepts". The dynamically-valued concepts are concepts that are found in the electronic text by comparing each word in the text to a semantic dictionary such as the UMLS knowledge base. The domain expert continues to construct using the combination of fixed text, via box 314, and concepts in the menus 318 and 320 until the query is complete.

Figure 4:
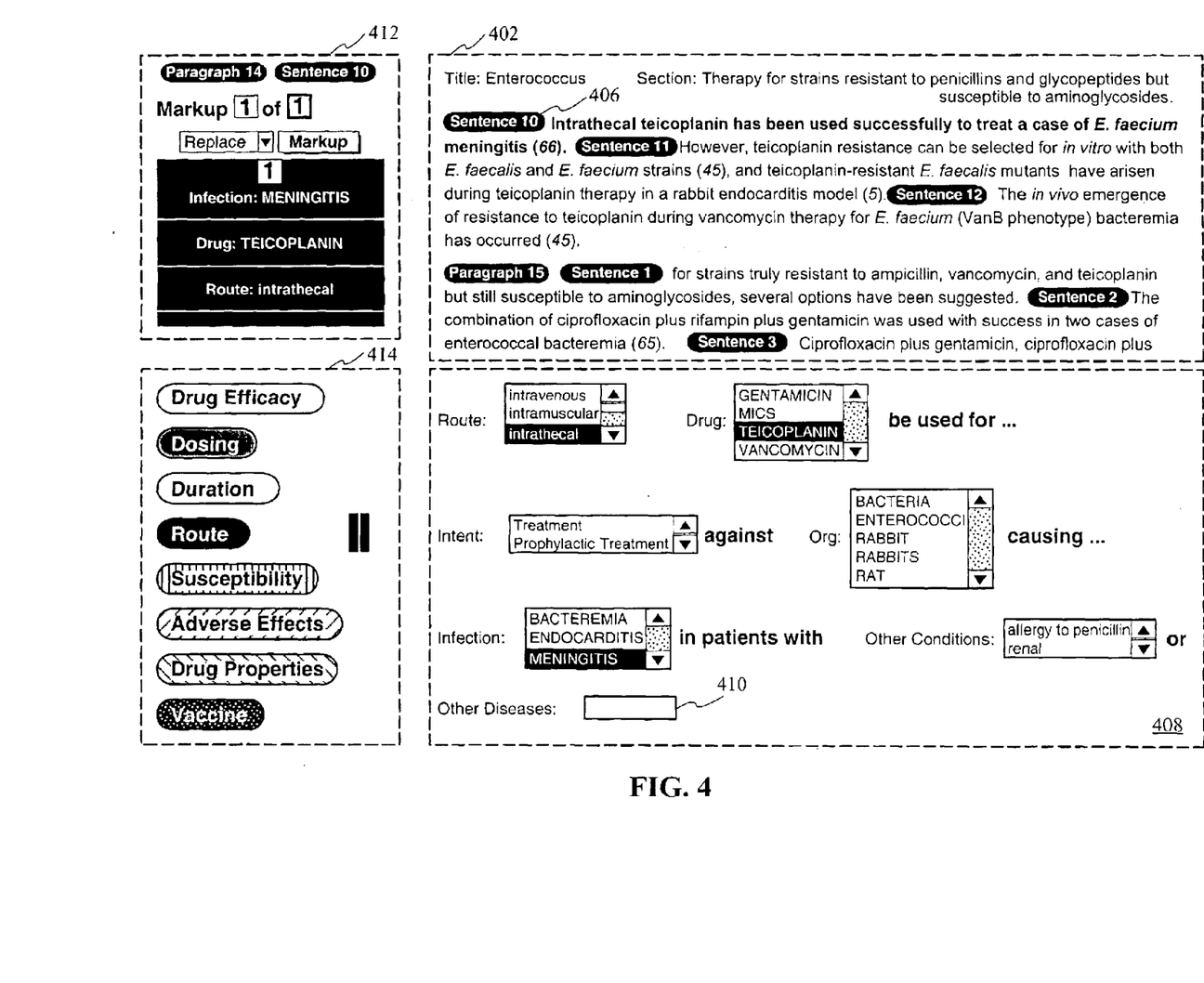
FIG. 4 illustrates the markup tool, via the indexing interface, of FIG. 1.

The markup tool exemplified in FIG. 4 employs the first subset of concept-values used in the query model to create a set of allowable concept-values for assignment. The domain expert assigns the allowable set of concept-value pairs to the text. The markup tool also has the ability to suggest assignment of query and markup tags to the domain expert for marking up the electronic text. A sentence 406 in a paragraph being assigned markup tags is shown in section 402. Section 408 shows the set of allowable concepts and values generated from the subset of concept-values used to create the set of queries in the query model. The domain expert has to choose from the list of allowable values shown in section 408 to assign markup tags to the sentence 406. He also has the ability to add values from within the markup tool. This is done in box 410 where the domain expert can enter a new concept. The present assigned markup tag for the sentence 406, if any, is shown in section 412. In section 412, the domain expert can add, replace, or delete assignments of markup tags to a sentence. A markup tag can also contain data that specify which query is associated with this assigned markup tag. The assigned markup tags can be stored directly in the electronic text or can be stored in record format in a markup instance database. Section 414 shows the categories of queries, e.g., drug efficacy, dosing, duration, route, susceptibility, adverse effects, drug properties, and vaccine, that can be selected to perform the markup. The categories of queries are constructed with the query model tool, i.e., they are modifiable and are not fixed.

Referring back to FIG. 1, the user query interface 110 presents the queries and restrictions that an end user uses to formulate his query. The user then submits a formulated query via the user query interface 110 to the search engine 112. The user query interface 110 can be a computer program that calls a function to select the concept-values to be submitted to the search engine 112. Instead of the user query interface 110, an external input 120 such as another computer program can submit a query to the search engine 112.

The search engine 112 tries to match the concept-value embedded in the submitted query to the subset assigned by the markup tool. If there are any matches, the search engine 112 displays a results page 114, which is the second interface where the user interacts with the system while performing a search. The search engine 112 via the results page 114 provides to the user, among others, an excerpt from the text where the relevant information is found and an option to output the query to an external database such as Medline to perform a guided Medline Search 116. The search engine 112 can also output the search results, the concept-values assigned to the search results, and/or the original concept-values submitted by the query, to an external electronic resource 118.

The Integration

The integration of the concept model 100, the markup tool 104, and the query model 102 in the electronic text indexing and search system ensures that the queries in the query model 102 and the markup tags assigned by the markup tool 104 integrates the concepts and values from the concept model 100. This increases the ease of marking up electronic text for the domain expert because he does not have to manually keep track of all the available concepts and values.

In this system, each query constructed by the domain expert becomes a template for many possible queries that can be formed by an end user as he chooses particular values for each concept from a list or menu in the user query interface. On the other hand, the query model tool dynamically updates the allowable concepts in the query model 102 when the domain expert modifies the set of concepts in the concept model 100. The query model tool, which can automatically generate the user query interface 110, may be implemented with HTML forms and controlled with Common Gateway Interface (CGI) scripts written in PERL or Java programming languages.

The domain expert can modify the concepts in the concept model 100 from within the concept model tool or from the markup tool 104. The domain expert can also add new concept-values dynamically via the query model tool. The domain expert can develop the concept model 100 and the query model 102 concurrently because the two interfaces share relevant data in the concept model 100. Further, the set of queries in the query model 102 can be stored in the concept model 100, thereby merging the query model 102 and the concept model 100.

Changes to the concept model 100 will appear in the markup tool 104 and the query model tool. Similarly, as the query model 102 is updated, concepts are automatically updated to keep the concept-values used in the markup tool 104 consistent with the concept-values used in the query model 102. The queries and the assigned markup tags integrate concept-values from the concept model 100. The integration of the concept model 100 with the markup tool 104 and the query model tool makes indexing electronic textbooks much quicker with less effort.

Unlike the conventional markup tool, not all the concept-values in the concept model 100 are available to the domain expert in the markup tool 104. The domain expert has to first create a set of queries using the query model tool to determine what the subset of the concept-values will be, and can only assign markup tags using this subset of concept-values. This prevents the problem of the markup tool 104 presenting a very long list of concepts-values encompassing all the concept-values in the concept model 100 which would become unmanageable by the domain expert.

In a more specific example, a document with at least one piece of ordinary unmarked text 106 is presented to a domain expert for markup tag assignment using the markup tool 104. Concepts in the concept model 100 are made available to the query model tool, and, at the same time, a function in the query model tool can add concept-values to the concept model 100. The domain expert uses a subset of the available concepts in the query model tool to generate a set of queries in the query model 102. The subset of concepts used in the query model 102 is used to generate a set of allowable concept-values available to the domain expert for the assignment of markup tags to the electronic text in the markup tool 104. The completed marked up text is presented in 108.

The aforementioned integration is transparent to end users of the integrated electronic text indexing and search system. An end user, via the user query interface 110, uses the query templates constructed by the domain expert in the query model 102 to formulate a query. The user-formulated query is submitted, via the user query interface 110, to the search engine 112. The search engine 112 uses the concept-values in the submitted query to match against the assigned markup tags. The search engine 112 searches only the assigned markup tags and not all of the text and therefore performs the search very quickly.

The integrated electronic text indexing and search system is designed to "ask questions first." That is, the system enables the domain expert, while marking up a piece of text, e.g., a sentence, to answer the question, "what query is this sentence answering?" A piece of text that answers the question, e.g., "drug causes disease", can thus be differentiated and distinguished from another piece of text that answers the question, "drug treats disease." This "question-based" design allows for a more structured and powerful text indexing system.

This system generates textbook indices that are more detailed and more useful to users. It requires domain dependent query model and concept model, as well as a domain independent document model, based on the explicit and implicit structure of HTML documents, to provide some of the knowledge/expertise required to create such complex indices.

Accordingly, whenever the document changes the indices would need to be updated correspondingly and appropriately. The integrated query-based indexing and retrieval system is affected by two different kinds of changes: document changes and query model changes. Both kinds of changes must be considered and the indices thoughtfully updated. As discussed before, indexing documents for fast and precise information retrieval is a very time-consuming and labor-intensive process. Therefore, an underlying goal would be to retain as much of the old indices as possible, i.e., only indices that are affected by the changes should be updated. By reusing as much knowledge represented in the indices as possible, time and hence cost needed for the updating can be minimized.

According to an aspect of the invention, the improvement to the integrated electronic text indexing and search system comprises an updating tool having a document change tool and a query model change tool for updating indices of marked-up documents that are affected by a document change, a query model change, or both. The updating tool further comprises an enhanced markup tool with an improved indexing interface. The document change tool is described hereinafter with reference to FIGS. 5–6 and the query model change tool is described hereinafter with reference to FIG. 7.

Figure 5:
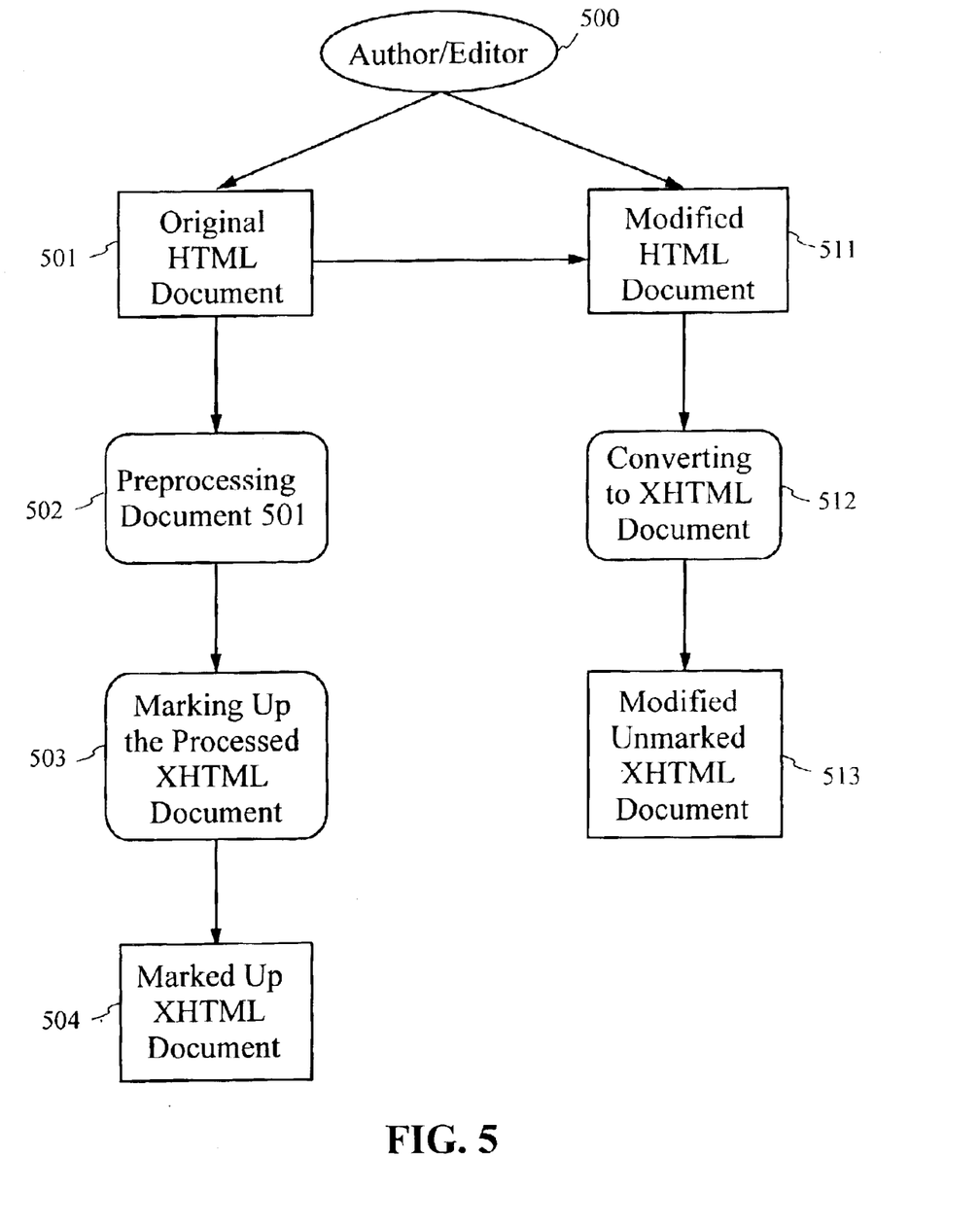
FIG. 5 is a top-level flow diagram illustrating, according to an embodiment of the present invention, steps involved in indexing an original document and preparing for updating indices due to changes made to the original document.
Figure 5A:
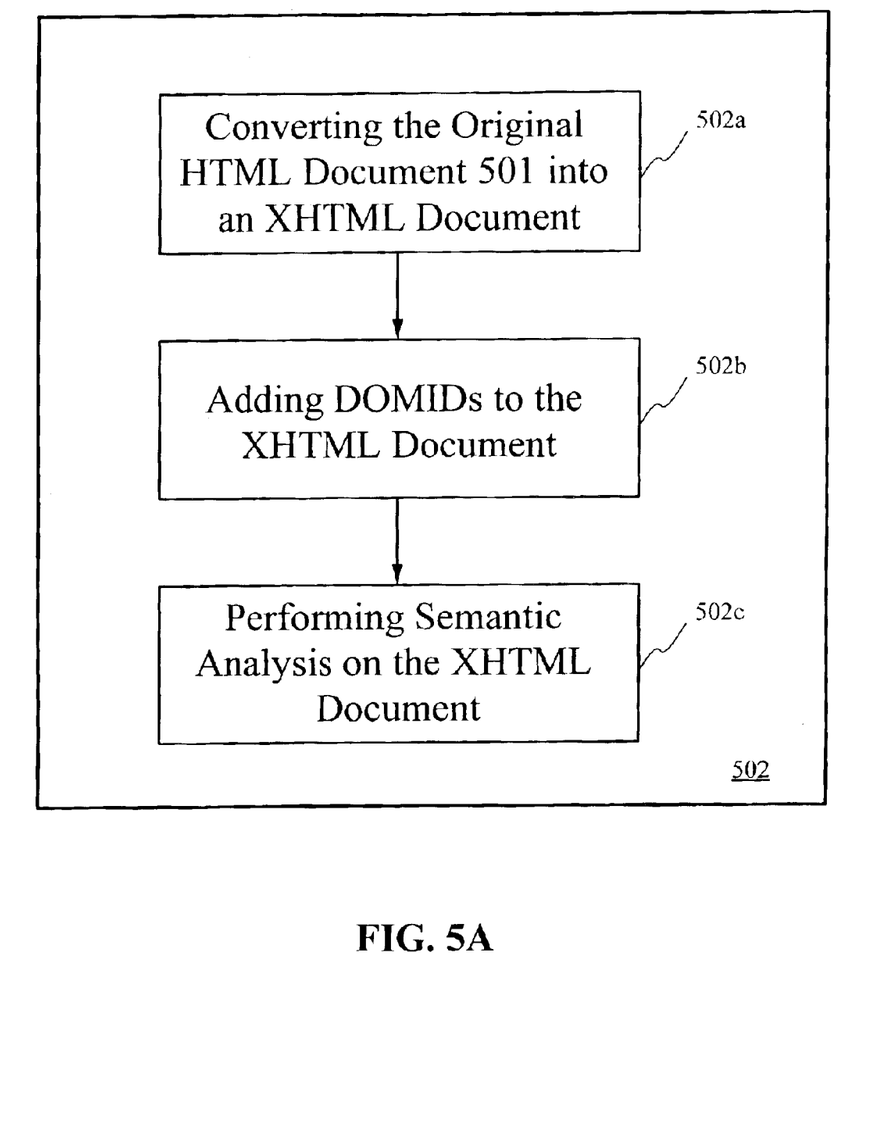
FIG. 5A illustrates the details of the preprocessing step shown in FIG. 5.

FIG. 5 is a top-level flow diagram illustrating on the left side how an ordinary HTML document 501 is first marked up into a properly indexed XHTML document using the integrated electronic text indexing and search system of FIG. 1. In step 502, the document 501 is preprocessed in preparation for indexing by a domain expert. As shown in FIG. 5A, this preprocessing step further includes, in step 502a, converting the original HTML document 501 into an XHTML document; in step 502b, identifying paragraphs and sentences and adding corresponding domain identifiers (DOMIDs) into the XHTML document; and, in step 502c, performing semantic analysis on the XHTML document. XHTML is an XML compatible version of HTML, i.e., regular HTML formatting that corresponds to XML structuring conventions. XHTML is a format that is compatible with the integrated electronic text indexing and search system shown in FIG. 1.

Referring back to FIG. 5, the preprocessed XHTML document from step 502 is then marked up by a domain expert in step 503 to generate a marked-up XHTML document 504.

FIG. 5 also shows, on the right side, when the original HTML document 501 is updated or otherwise modified, e.g., externally by an author or editor 500 updating a sentence, a paragraph, a section, or a chapter of an electronic textbook, a modified/updated version of the original HTML document 501 is created as a new, unmarked HTML document 511. In step 512, which is essentially the same as step 502a, the modified/updated HTML document 511 is converted via a processing tool into an XHTML document 513.

In an exemplary embodiment, to retain as much of the old indices as possible, the document change tool of the present invention takes the previously indexed XHTML document 504 and the modified, unmarked XHTML document 513 to generate a composite XHTML document with changes highlighted or otherwise identified so that it would be apparent to a domain expert that only indices affected by the changes should be updated.

Figure 6:
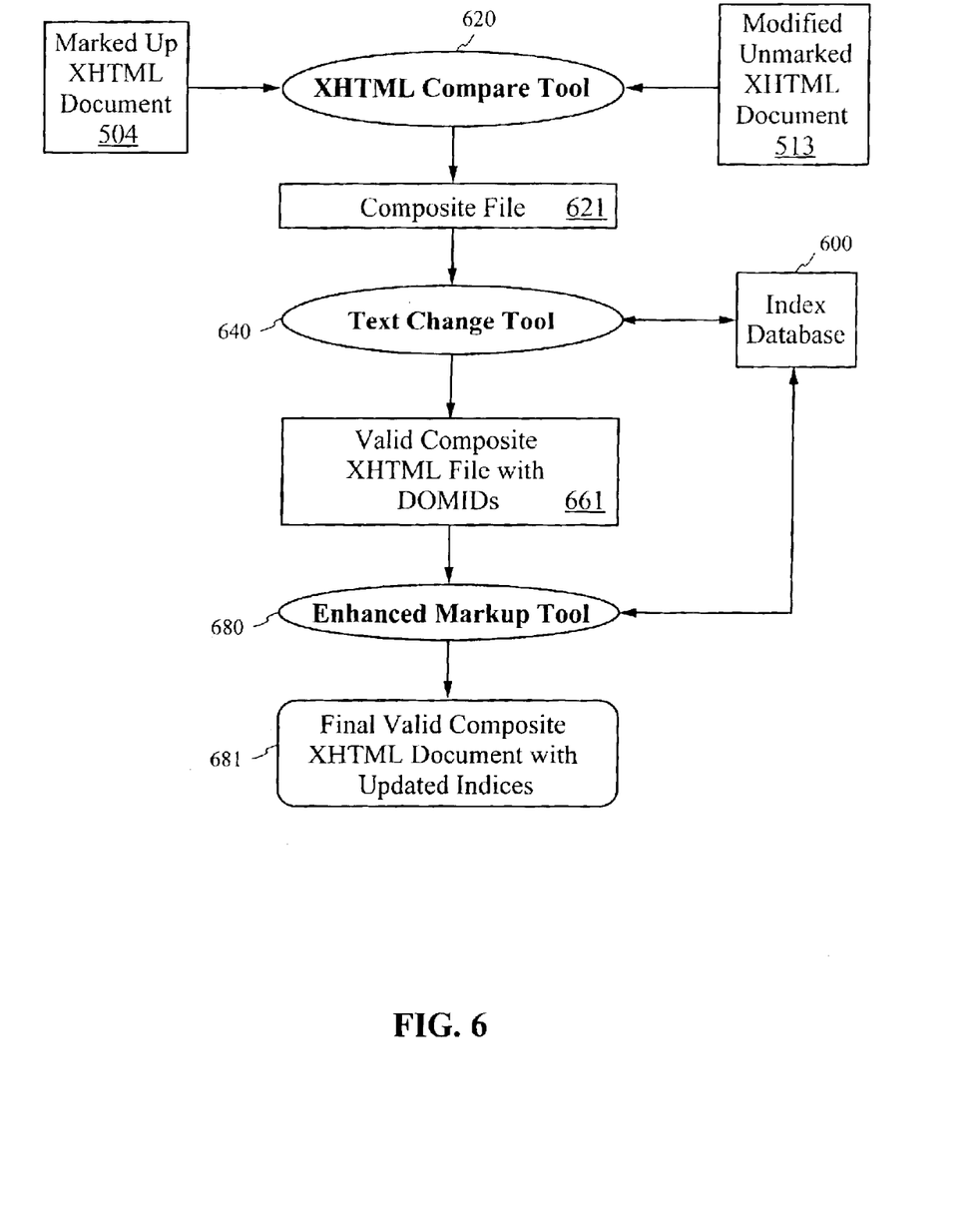
FIG. 6 is a detailed flow diagram illustrating the document change tool concept according to an embodiment of the present invention.

FIG. 6 is a detailed flow diagram illustrating the document change tool comprising an XHTML compare tool 620, a text change tool 640, and an enhanced markup tool 680. In an embodiment, the XHTML compare tool is a tool, HTML Compare, distributed by Applian Technologies Inc. of San Francisco, Calif. After comparing the two input XHTML documents 504 and 513, the XHTML compare tool 620 outputs a composite file 621 containing all the text in both the original, indexed XHTML document 504 and the modified, unmarked XHTML document 513. In some cases, the composite file 621 may need to be converted via a processing tool such as one described in step 512 into a valid XHTML document that is compatible with the underlying system.

In the composite file 621, text that was in the document 504 but not in the document 513 (e.g., the text that was deleted in the editing process) is identified as deleted text. In a specific implementation, such deleted text is placed in the composite file 621 between surrounding HTML <span> tags and an attribute is added thereto to identify the deleted text. Similarly, text that was not in the document 504 but in the document 513 (e.g., text added via an editing process or entity 500) is identified in the composite file 621 as new text. In a specific implementation, such new text is placed between surrounding HTML <span> tags and an attribute is added thereto to identify the new text.

An index retrieval tool, which may be a part of the text change tool 640, puts the index information into the composite file 621. The index information may be retrieved from an index database 600. The text change tool 640 takes the composite file 621 as input and accordingly updates the index database 600 to reflect changes highlighted or identified in the composite file 621, particularly concentrating on whether an insertion, deletion, or change has taken place.

For example, if a sentence previously indexed is identified as being deleted, the text change tool 640 deletes the corresponding index entries in the index database 600. The interpretations of document changes are listed in Table 1 below. By annotating the database of existing indices, the enhanced markup tool, shown via indexing interface in FIG. 8, can then display to the domain experts the insertions and changes as they re-mark up the updated document.

Table 1 shows how document changes are interpreted by the system. Whenever there is an insertion or modification inside a portion of the text (i.e., an HTML text element) that was previously indexed by an indexer, that portion is highlighted as "index (now) suspect". If an indexed text element is deleted, the corresponding index is automatically deleted from the database 600.

A database column, e.g., a column called ERROR_TEXT, holds the change flags for every instance of indexing in the system. These flags can have the following values:

NEW_TEXT: identifies newly inserted text.

MODIFIED_TEXT: identifies text that has been modified.

TABLE 1

|  | Inside Index | Outside Index |
| --- | --- | --- |
| Insertion | Markup suspect: NEW_TEXT flag set. MODIFIED_TEXT/NEW_TEXT flag set for ancestors. | NEW_TEXT flag set. |
| Deletion | Delete index entry: MODIFIED_TEXT flag set for ancestors/ delete ancestor index entry. | Do nothing |
| Modification | Markup suspect: MODIFIED_TEXT flag set. MODIFIED_TEXT flag set for ancestors. | MODIFIED_TEXT flag set. |

The text change tool operations, i.e., 'Insertion', 'Deletion' and 'Modification', are defined at the HTML element-level.

The text change tool 640 also acts as a post processor for processing and converting the composite file 621 into a valid composite XHTML document 661 compatible with the enhanced markup tool 680. This involves the following steps:

1. Removing from the composite file 621 text that has been identified as deleted.
2. Retaining text that has been identified as new.
3. Assigning new domain identifiers (i.e., a new domain identification number—DOMID) to newly added indexable elements in the text. An indexable element is a complete sentence or a paragraph, as opposed to a new word inside an old sentence. This step essentially corresponds to step 502b of FIG. 5A.
4. Stripping away additional tags and attributes added by the XHTML compare tool 620 to generate the valid composite XHTML document with DOMIDs 661.

The enhanced markup tool 680 performs semantic analysis, which is essentially the same as step 502c of FIG. 5A, on the valid composite XHTML document with DOMIDs 661 to generate a final valid composite XHTML document. The enhanced markup tool 680 highlights or otherwise identifies, according to indexing information retrieved from the index database 600, where text has been added, deleted, replaced, or otherwise modified/updated in the final valid composite XHTML document.

In step 681, the final valid composite XHTML document plus the indices in the index database is displayed to a domain expert or an index verifier via the indexing interface of the enhanced markup tool 680. The domain expert indexes the highlighted, newly added portions of the text and determines whether the indices of the highlighted portions of the modified text can be retained or need to be deleted, or new indices need to be deleted. The enhanced markup tool 680 writes the changes specified by the domain expert to the index database 600, i.e., once the corrections have been made, the index database is appropriately updated. Because the domain expert only needs attend to highlighted portions of the text and does not have to re-marking up the entire document, the time and hence cost necessary to index a previously indexed document that is affected by changes/updates to the original document is greatly reduced.

Figure 7:
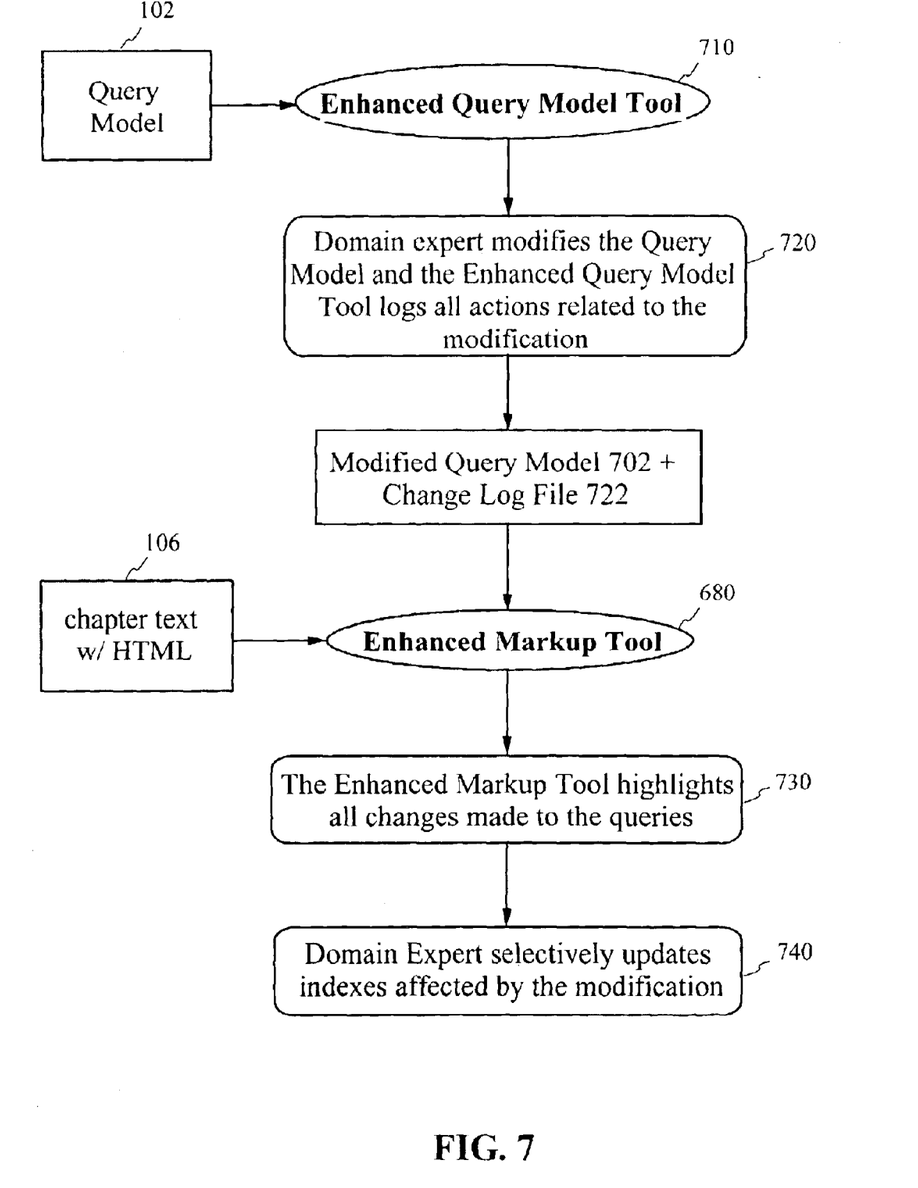
FIG. 7 is a flow diagram illustrating the query model change tool concept according to an embodiment of the present invention.

FIG. 7 is a flow diagram illustrating the query model change tool concept according to an embodiment of the present invention. The query model change tool comprises an enhanced query model tool 710. In step 720, the enhanced query model tool 710 generates an updated query model 702 and a change log file 722. More specifically, when the query model 102 is modified, e.g., by a domain expert, via the enhanced query model tool 710, the tool 710 logs to the change log file 722 any and all changes either to the text portions or to the concept-values that compose each query. That is, the query model tool 710 is enhanced to allow the logging of actions that have taken place as queries are modified to add or remove new concepts or to alter text portions of the queries. The query model tool 710 also logs any queries that have been deleted, so that the relevant markup may be made obsolete.

The enhanced markup tool 680 subsequently in steps 730 uses this new version of the query model 702 together with the change log file 722 to display via the indexing interface to indexers (domain experts) changes that have been made to each of the queries. As shown in step 740, the domain expert then modifies existing document indices accordingly. As will be described further with reference to FIG. 9, at least two kinds of indications of change are displayed in the enhanced indexing interface of the enhanced markup tool—which sentences have had the corresponding markups changed and what the changes are to the corresponding query templates. That is, the enhanced markup tool highlights the sentence or paragraphs that have been marked up with a query model that has changed and also displays information about how the query model has changed.

Again, since the domain expert only has to modify the document indices that are affected by changes to the queries in the query model, the time and resources required for updating the indexed document are minimized, resulting an even more efficient and effective integrated electronic text indexing and search system.

Figure 8:
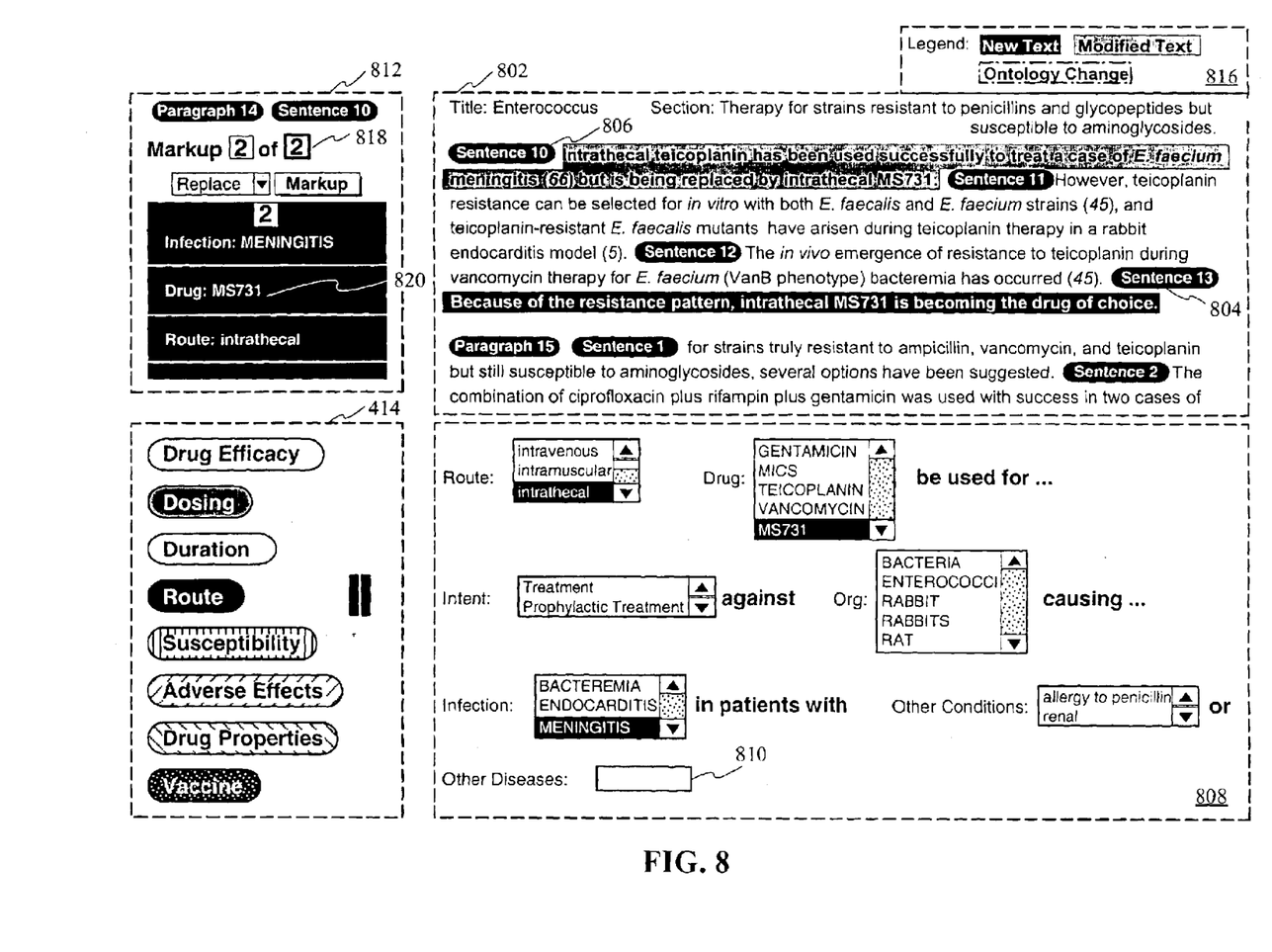
FIG. 8 illustrates the improved indexing interface of the enhanced markup tool having integrated with results generated by the document change tool according to an embodiment of the present invention.

FIG. 8 illustrates, according to an embodiment of the present invention, an improved indexing interface of the enhanced markup tool 680 incorporating outputs generated by the document change tool. In FIG. 8, like sections and elements are denoted with like reference numbers as shown in FIG. 4.

A sentence 806 in a paragraph to be assigned markup tags is shown in section 802. The sentence 806 has been modified by an author and is highlighted according to the legend, New Text, Modified Text, Ontology Change, in section 816 to identify that it has been changed and thus alerts the domain expert that the markup specified in section 812 may be wrong. In section 812, the domain expert can add, replace, or delete assignments of markup tags to a sentence. In this case, the markup shown in section 412 of FIG. 4 is still valid, but a new markup 818 is shown in section 812 to acknowledge that a new treatment (Drug: MS731) 820 has been added to the sentence 806. Also shown in section 802, a new sentence 804 was added by the author and is highlighted according to the legend in section 816. The highlighted new sentence 804 alerts the domain expert that new markup tags may need to be added.

Section 808 shows the set of allowable concepts and values from where the domain expert can choose to assign markup tags to the sentence 804. Box 810 is essentially the same as box 410 of FIG. 4 where the domain expert can enter a new concept from within the enhanced markup tool 680. Section 414 shows the categories of queries that can be selected to perform the markup.

Figure 9:
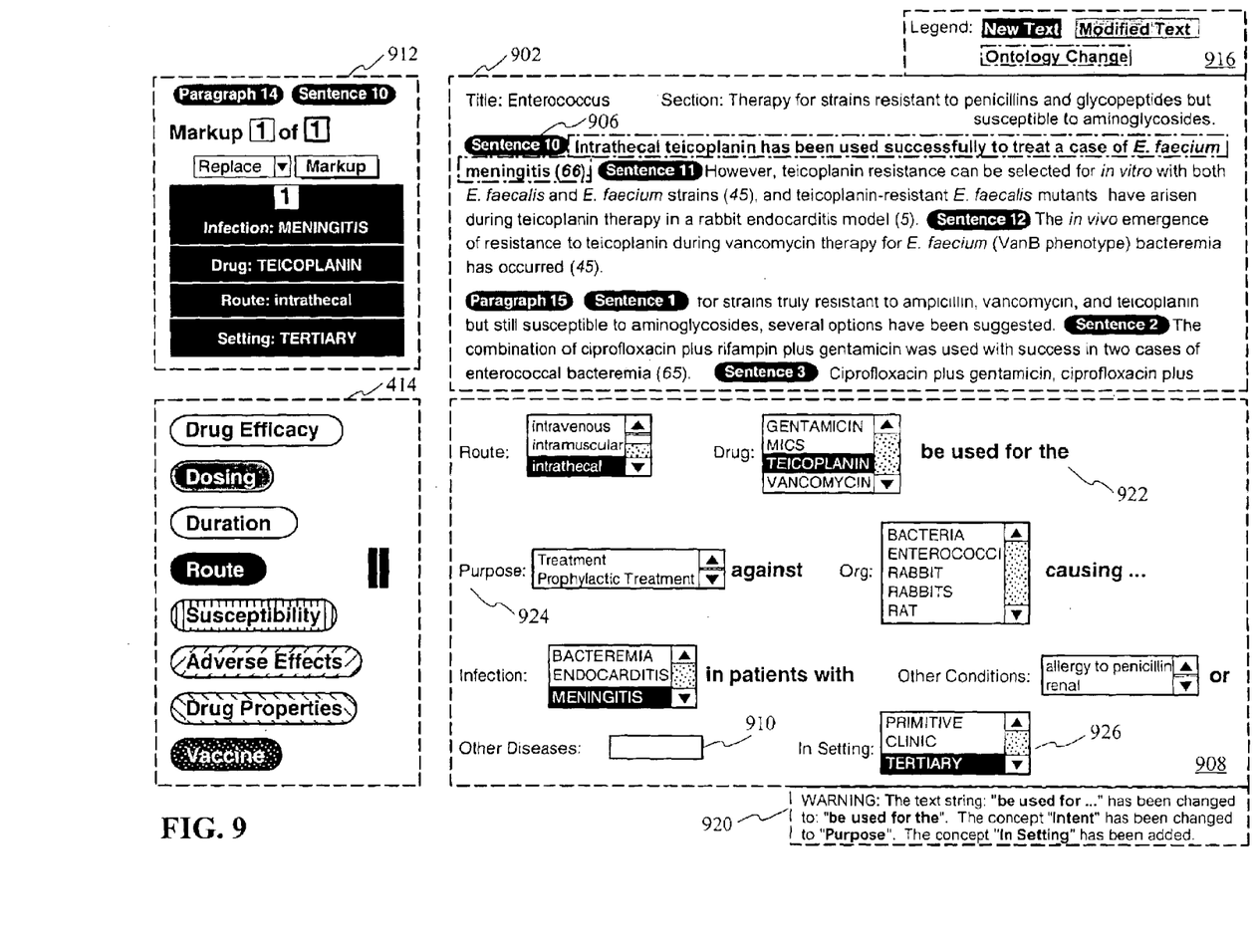
FIG. 9 illustrates the improved indexing interface of the enhanced markup tool having integrated with results generated by the query model change tool according to an embodiment of the present invention.

FIG. 9 illustrates, according to an embodiment of the present invention, an improved indexing interface of the enhanced markup tool 680 incorporating outputs generated by the query change tool. For the sake of clarity, in this example, it is assumed that the original text of the indexed document has not been changed or modified as shown in FIG. 4. In FIG. 9, like sections and elements are denoted with like reference numbers as in shown in FIG. 4.

In this example, sentence 906 shown in section 902 has been marked with a query on "route of administration" shown in section 908. However, sentence 906 is highlighted according to the legend in section 916 to identify that the corresponding query description has been changed, i.e., a change affecting this already indexed sentence was made to the query model, thereby suggesting to the domain expert that the corresponding markup may need to be modified. In section 920, the output of the query model change tool is displayed, which identifies a changed text string 922, a changed concept 924, and an inserted concept 926 shown in section 908. The domain expert modifies the indices of the indexed document by responding to comments displayed in section 920. Box 910 is essentially the same as box 410 of FIG. 4 where the domain expert can enter a new concept from within the enhanced markup tool 680. Section 912 differs from section 412 of FIG. 4 in that an extra field has been marked up that was added in response to the query change shown in section 908. Section 414 is the same as shown in FIG. 4.

A new and inventive updating tool comprising the document change tool and the query model change tool has been described in detail. This updating tool makes the integrated electronic text indexing and search system very flexible and convenient to use. More importantly, the consistency of the system after a document change, a query model change, or both, is maintained with this updating tool.

It should be understood that the present invention is not limited to or defined by what is shown or discussed herein; rather, the invention may be practiced with the specific details herein omitted or altered. The drawings, description and discussion herein illustrate technologies related to the invention, show examples of the invention and provide examples of using the invention. Known methods, procedures, systems, and components may be discussed or illustrated without giving details, so to avoid obscuring the principles of the invention. It will be clear to one skilled in the art that the above embodiments may be altered in many ways without departing from the scope of the invention. For example, to keep pace with the increasing trend of information technology, several tools of the integrated electronic text indexing and search system, including the user query interface and search interface, may be implemented in portable information appliances and devices, e.g. handheld personal computing devices, laptop, personal digital assistant, etc. In addition to making the system convenient to use, such implementation is anticipated to increase the efficiency and productivity of the user.

In another example, an external search interface is implemented. With this general external search interface, a user would be able to invoke a search to other search engines from within the integrated electronic text indexing and search system. Such implementation is anticipated to increase the user's ability to find relevant information from other sources. This also removes psychological barrier that the user faces if there is no provision of external search.

Moreover, although the change log file 722 is an XML file in this embodiment, it could be any persistent data repository, such as a record-based "flat" file or a relational database. Also, as implemented in this embodiment, the system uses the domain identification number; however, the log file changes can be matched to the markup instances by other methods or implementations, for example, generating a unique identification using a hash function, or by matching the old query text using a direct string comparison.

Accordingly, the scope of the invention should be determined by the following claims and their legal equivalents.

We claim:

1. An integrated electronic text indexing and search system comprising a concept model defining a set of concept-value pairs modifiable by a domain expert, a query model characterized as a set of queries constructed by the domain expert in terms of a subset of the set of concept-value pairs, and a markup tool for generating a set of allowable concept-value pairs based on the subset and for assigning the allowable concept-value pairs via markup tags to sentences or a piece of electronic text, wherein the improvement comprises:

an updating tool for updating indices of a previously marked-up document that is affected by a change to the sentences or the piece of electronic text, a change to the query model, or both.

2. The system of claim 1, wherein the updating tool comprises a document change tool, a query model change tool, and an enhanced markup tool comprising a text analyzer and an indexing interface.

3. The system of claim 2, wherein the document change tool comprises:

a document compare tool for comparing the previously marked-up document and an unmarked document containing changes to the sentences or the piece of electronic text to generate a composite file thereof; and a text change tool for identifying paragraphs and sentences in the composite file, placing corresponding indexing information into the composite file, and modifying an index database according to the indexing information.

4. The system of claim 3, wherein the index database comprises a storage means for holding change flags for every instance of indices in the system, the change flags having at least a first value for identifying newly inserted text and a second value for identifying text that has been modified.

5. The system of claim 4, wherein the text change tool modifies the index database by marking up suspect index or deleting index and correspondingly setting the first value, setting the second value, or doing nothing.

6. The system of claim 3, wherein the document change tool further comprises:

a processing tool for converting the composite file into a format that is compatible with the system; and an index retrieval tool for retrieving indexing information to place in the composite file.

7. The system of claim 2, wherein the query model change tool comprises an enhanced query model tool and a log file, the enhanced query model tool logging to the log file actions that are taken as the set-of queries are modified to add or remove new concept-value pairs or to change the scope of a particular concept.

8. The system of claim 2, wherein the enhanced markup tool displays the previously marked-up document and highlights the change to the sentences or the piece of electronic text, the change to the query model, or both, thus enabling the domain expert to marking up only indices of the previously marked-up document that are affected thereby.

9. A method for updating indices of previously indexed documents in an integrated electronic text indexing and search system comprising a concept model defining a set of concept-value pairs modifiable by a domain expert, a query model characterized as a set of queries constructed by the domain expert in terms of a subset of the set of concept-value pairs, and a markup tool for generating a set of allowable concept-value pairs based on the subset and for assigning the allowable concept-value pairs via markup tags to sentences or a piece of electronic text, wherein the improvement comprises the step of:

updating indices of a previously marked-up document that is affected by a change to the sentences or the piece of electronic text, a change to the query model, or both.

10. The method according to claim 9, further comprising the steps of:

comparing the previously marked-up document and an unmarked document containing changes to the sentences or the piece of electronic text;

generating a composite file containing content of the previously marked-up document with the changes to the sentences or the piece of electronic text identified;

placing into the composite file indexing information that corresponds to the changes to the sentences or the piece of electronic text;

modifying an index database in accordance with the indexing information;

processing and analyzing the composite file to generate a properly indexed file;

displaying the properly indexed file with the changes to the sentences or the piece of electronic text highlighted; and updating only indices of the highlighted sentences or the highlighted piece of electronic text.

11. The method according to claim 9, further comprising the steps of:

logging actions that are taken as the set of queries are modified to add or remove new concept-value pairs or to change the scope of a particular concept;

displaying the sentences or the piece of electronic text, the set of modified queries, and the corresponding actions, wherein the sentences or the piece of electronic text is highlighted according to the log file to identify that a corresponding query description has been changed in the query model; and updating only indices of the highlighted sentences or the highlighted piece of electronic text.

12. The method according to claim 11, wherein the displaying step further comprises the step of:

identifying a changed text string, a changed concept, and an inserted concept.

13. A computer readable medium accessible by a processor and carrying instructions executable by the processor for implementing method steps that updates indexed documents in an integrated electronic text indexing and search system comprising a concept model defining a set of concept-value pairs modifiable by a domain expert, a query model characterized as a set of queries constructed by the domain expert in terms of a subset of the set of concept-value pairs, and a markup tool for generating a set of allowable concept-value pairs based on the subset and for assigning the allowable concept-value pairs via markup tags to sentences or a piece of electronic text, the instructions comprising:

computer program means for comparing the previously marked-up document and an unmarked document containing changes to the sentences or the piece of electronic text;

computer program means for generating a composite file containing content of the previously marked-up document with the changes to the sentences or the piece of electronic text identified;

computer program means for placing into the composite file indexing information that corresponds to the changes to the sentences or the piece of electronic text;

computer program means for modifying an index database in accordance with the indexing information;

computer program means for processing and analyzing the composite file to generate a properly indexed file; and computer program means for displaying in an indexing interface the properly indexed file and highlighting the changes to the sentences or the piece of electronic text.

14. The computer readable medium of claim 13, further comprising:

computer program means for logging actions that are taken as the set of queries are modified to add or remove new concept-value pairs or to change the scope of a particular concept;

computer program means for displaying in an indexing interface the sentences or the piece of electronic text, the set of modified queries, and the corresponding actions; and computer program means for highlighting the sentences or the piece of electronic text according to the log file.

15. The computer readable medium of claim 13, further comprising:

computer program means for identifying in an indexing interface a changed text string, a changed concept, and an inserted concept.

* * * * *